Patented Oct. 10, 1933

1,929,902

UNITED STATES PATENT OFFICE 1,929,902

BORAX MANUFACTURING PROCESS

Homer L. Robson, Richmond, Calif., assignor to Burnham Chemical Company, Westend, Calif., a corporation of Nevada No Drawing. Application January 21, 1930
Serial No. 422,491

2 Claims. (Cl. 23—39)

This invention relates to a process for the manufacture of borax from a brine such as occurs naturally at Searles Lake in California. Such a brine contains various ions and molecules among which are sodium, potassium, carbonate, bicarbonate, chloride and borate. These various ions and molecules are present in the brine in such condition that the recovery of any group of them in the form of a salt is relatively complicated, considerable difficulty being imposed upon the recovery of any salt in a pure form. Borax which forms an article of commerce is a salt whose recovery is desired from the brine. However, its removal is rendered difficult by the several salts present which, when the brine is concentrated to secure the borax in its supersaturated condition so that it may be crystallized from out of the solution, interfere with the crystallization of the borax and come down with it so that the borax is impure.

It is the broad object of my invention to devise a process for the manufacture of borax from a complex brine in which the recovery of the borax is materially facilitated.

The invention possesses other advantageous features and objects, some of which with the foregoing will be set forth in the following specification where I have outlined the preferred form of the borax manufacturing process of my invention. It is to be understood that the invention, as defined by the claims, is to be accorded a range of chemical equivalents consistent with the state of the prior art.

In handling Searles Lake brine I have discovered that the recovery of borax from the brine is facilitated by increasing the excess alkalinity of the brine so that the borax is rendered more soluble and a higher concentration of the borax can be attained in the brine before subjecting it to conditions under which the borax crystallizes out. I have discovered that the excess alkalinity may be increased by removing from the solution the acid salts or one of the salts which normally interferes with the removal of borax in a substantially pure state. This salt is that designated as trona, the sesqui-carbonate of sodium, $Na_2CO_3.NaHCO_3.2H_2O$. Instead of removing trona to increase the excess alkalinity I may also treat the brine so that carbon dioxide is evolved.

I will use the term "excess alkalinity" herein in place of the more usual designation with respect to the ionic value of a solution, namely, the pH value or hydrogen ion concentration since the determination of this value in the complex brines handled presents appreciable difficulties. The excess alkalinity, in the present case, has been determined by calculating all the $CO_2$ present as $Na_2CO_3$, all the $H_2S$ as $Na_2S$, all the $B_2O_3$ as $Na_2B_4O_7$, and subtracting the total number of equivalents of $Na_2O$ in these salts from the total number of equivalents of $Na_2O$ as found by titrating the solution with a standard acid using methyl red as an indicator. The excess alkalinity may be expressed $Na_2O$, $NaOH$ or $Na_2CO_3$ and, although the latter of these is generally adapted I have preferably reported excess alkalinity in this case as sodium hydroxide.

In conducting the borax manufacturing process of my invention I may heat the brine to a relatively high temperature sufficient to secure an evolution of carbon dioxide from the brine. This heating may be effected in solar ponds wherein the naturally high temperatures occurring in the desert region where Searles Lake is located are taken advantage of, or suitable artificial means such as evaporators may be employed, means being provided for the efficient removal of carbon dioxide from them so that they do not become gas bound and their thermal efficiency impaired. Upon heating the brine carbon dioxide will be liberated and supersaturation with trona will occur which, as the heating is continued, precipitates from the solution. Upon precipitation of the trona from the solution the excess alkalinity increases and the borax becomes more soluble.

When evaporation is effected and concentration had at temperatures under 25° C., the amount of trona precipitated is quite small and the borax solubility does not change to any great extent. However, when the evaporation is conducted at higher temperatures, in the region of 35° C., a greater amount of trona will be precipitated and the supersaturation with respect to trona will increase as much as ten grams per liter. When a brine has been treated in this manner I have found the solubility of anhydrous borax in the final brine at a temperature of 23° C. is as high as 60 grams per liter. Some trona is still left in solution.

In a raw Searles Lake brine containing approximately 210 grams per liter sodium chloride, 85 grams per liter sodium sulphate, 55 grams per liter potassium chloride, 65 grams per liter sodium carbonate and 20 to 22 grams per liter sodium tetraborate, the akalinity, measured in grams per liter of sodium hydroxide, increases from a value of about zero to 2 grams per liter to a value of 15 grams per liter or more. The boric oxide solubility in the brine is materially increased with the increased excess alkalinity.

With the brine evaporated under ordinary solar conditions some exchange of carbon dioxide will take place with the atmosphere. However, under these conditions the exchange is relatively unimportant and is not as much of a factor in determining the excess alkalinity as is the precipitation of trona from the brine. Under conditions where artificial temperatures are maintained and the $CO_2$ evolved may be substantially entirely removed, its evolution from the solution is quite important.

After the brine has been concentrated and some of the trona removed, it will be found that its solubility is materially increased. However, since Searles Lake brine normally contains both potassium and chloride ions which form potassium chloride, the solubility of the borax which is known to be affected by the potassium chloride concentration is slightly increased due to the increase in concentration of the KCl.

Following the treatment of the brine to remove the trona or to secure the evolution of carbon dioxide, it is treated to prepare the brine for the recovery of the borax. Since the brine usually contains sodium carbonate and other salts which, upon concentration of the brine, increases in percentage to a value considerably in excess of that originally present, it is expedient to prevent their precipitation with the borax. This I have accomplished by diluting the brine with water, usually water containing sodium chloride since this is readily available in the region of Searles Lake. If the brine were treated directly for the recovery of the borax some of the other salts would precipitate and the borax would be secured impure.

Removal of the sodium carbonate and others of the salts prior to the treatment for the recovery of borax may also be effected by lowering the temperature to a point sufficient to induce their crystallization from the solution.

Either of the processes mentioned above for preventing the sodium carbonate from subsequently contaminating the borax are effective, the point to be borne in mind and strictly observed is that the salts are prevented from coming down with the borax. It may be stated that the addition of water to dilute the brine does not materially effect the yield of borax secured from the solution.

To secure the removal of the borax from the treated brine I prefer to reduce the excess alkalinity to a value sufficient to secure precipitation of the borax. In this connection I have found it expedient to preserve a degree of the alkalinity sufficient to prevent precipitation of the trona. Such a value I have found to be between 2 to 4 grams per liter of sodium hydroxide concentration; each gram per liter of the sodium hydroxide neutralized will lower the solubility of borax by about 2½ grams per liter expressed as sodium tetraborate. Acidification of the brine is effected with a reagent which will not increase the saturation with respect to trona to an undesirable degree. In this connection the use of carbon dioxide is inadvisable inasmuch as this increases the saturation with respect to trona materially. As a suitable acid reagent I have found sulphur dioxide to be a convenient and excellent one although other acids such as sulphuric and hydrochloric acids may be employed. After acidification of the brine, its temperature is preferably lowered so that the borax readily crystallizes out and the borax is recovered in a relatively pure state.

I claim:

1. The process of recovering borax from Searles Lake brine which comprises increasing the excess alkalinity of the brine by removing trona from the brine, preventing the precipitation of sodium carbonate by diluting the brine with water, reducing the excess alkalinity of the brine sufficiently to precipitate borax but not sufficiently to precipitate trona by using sulphur dioxide, and cooling the brine to precipitate borax.

2. The process of recovering borax from Searles Lake brine which comprises heating and evaporating the brine to increase the alkalinity thereof by removing trona from the brine, then diluting the brine with water to prevent the precipitation of sodium carbonate therefrom; then treating the brine with an acid such as sulphur dioxide to reduce the alkalinity of the brine, and finally cooling the brine to precipitate borax.

HOMER L. ROBSON.